United States Patent [19]
Paritsky et al.

[11] Patent Number: 6,091,497
[45] Date of Patent: Jul. 18, 2000

[54] SENSOR AND A METHOD FOR MEASURING DISTANCES TO, AND/OR PHYSICAL PROPERTIES OF, A MEDIUM

[75] Inventors: Alexander Paritsky, Jerusalem; Alexander Kots, Ashdod, both of Israel

[73] Assignee: Phone-OR Limited, Israel

[21] Appl. No.: 09/037,137

[22] Filed: Mar. 9, 1998

[30] Foreign Application Priority Data

Mar. 17, 1997 [IL] Israel .......................................... 120464

[51] Int. Cl.[7] .................................................. G01B 11/14
[52] U.S. Cl. ........................... 356/373; 356/372; 356/375
[58] Field of Search .................................. 356/375, 73.1, 356/336, 338, 39, 440; 385/31; 350/96.1

[56] References Cited

U.S. PATENT DOCUMENTS

| | | | |
|---|---|---|---|
| 4,576,436 | 3/1986 | Daniel ..................................... | 350/96.1 |
| 5,345,076 | 9/1994 | Reddy ................................. | 250/231.13 |
| 5,402,508 | 3/1995 | O'Rourke et al. ......................... | 385/31 |

FOREIGN PATENT DOCUMENTS

0716291A2  6/1996  European Pat. Off. .
2 399 000   2/1979  France .
26 20 914  11/1977  Germany .
4305195C1   6/1994  Germany .

*Primary Examiner*—Frank G. Font
*Assistant Examiner*—Roy M. Punnoose
*Attorney, Agent, or Firm*—Townsend and Townsend and Crew LLP

[57] ABSTRACT

The invention provides a sensor for sensing the distances to a medium and/or displacements and the physical properties thereof, including a housing, at least one pair of solid light guides each having an input end face and an output end face, at least one source of light and at least one light intensity measuring means, the input end face of a first light guide being optically coupled to a source of light an d the output end face of a second light guide being optically coupled to a light intensity measuring means, the light guides being optically isolated from each other while at least the faces thereof are located adjacent to each other, each of the faces being cut at an angle $\theta$ with respect to the optical axis of its waveguide, so as to include an angle a between the axes thereof, the arrangement being such that, upon operation, the light emerging from the output end portion of the first light guide impinges on a surface of a medium at an angle of incidence $\beta$, and wherein $\beta = f(\alpha, \theta)$. The invention also provides a method for measuring the displacement of a body.

11 Claims, 3 Drawing Sheets

SENSOR AND A METHOD FOR MEASURING DISTANCES TO, AND/OR PHYSICAL PROPERTIES OF, A MEDIUM

FIELD OF THE INVENTION

The present invention relates to sensors and methods of measuring distances to, position, and/or displacements and physical properties of, a medium. More particularly, the present invention relates to light sensors and to methods utilizing such sensors for a vast range of measurements.

BACKGROUND OF THE INVENTION

The term "measurement of distances to, position, and/or displacements and physical properties of, a medium," as used herein, is intended to encompass the performance of measurements or sensing of micro- and/or macro-movements, which can be utilized to construct microphones, hydrophones, accelerometers, pressure/vacuum gauges, temperature sensors, displacement meters, sensors measuring thickness of micro-coating, surface characteristics of silicon wafers, high accuracy measurement of movements and positioning of different kinds of shafts, gauges, valves, sliding tables and the like.

Sensors of the general type of the present invention and a method of measuring are known from U.S. Pat. No. 5,771,091 the teachings of which are incorporated herein by reference. In cases where the location to be measured is very close to the sensor, however, the utilization of optical fibers as light guides presents a technical problem, as the optical fibers are very small, e.g., up to a few millimeters; processing such small and delicate guides must be carried out in special ways.

It is thus a broad object of the present invention to overcome the above-mentioned difficulty and to provide light-based sensors utilizing solid light guides.

SUMMARY OF THE INVENTION

In accordance with the present invention there is therefore provided a sensor for sensing the distances to a medium and/or displacements and the physical properties thereof, comprising a housing; at least one pair of solid light guides each having an input end face and an output end face; at least one source of light and at least one light intensity measuring means, the input end face of a first light guide being optically coupled to a source of light and the output end face of a second light guide being optically coupled to a light intensity measuring means, the light guides being optically isolated from each other while at least the faces thereof are located adjacent to each other, each of said faces being cut at an angle θ with respect to the optical axis of its waveguide, so as to include an angle α between the axes thereof, the arrangement being such that, upon operation, the light emerging from the output end portion of said first light guide impinges on a surface of a medium at an angle of incidence β, and wherein β=ƒ(α,θ).

The invention further provides a method of measuring a displacement of a body, comprising providing a sensor including a housing; at least one pair of solid light guides each having an input end face and an output end face; at least one source of light and at least one light intensity measuring means, the input end face of a first light guide being optically coupled to a source of light and the output end face of a second light guide being optically coupled to a light intensity measuring means, the light guides being optically isolated from each other while at least the faces thereof are located adjacent to each other, each of said faces being cut at an angle θ with respect to the optical axis of its waveguide, so as to include an angle α between the axes thereof, the arrangement being such that, upon operation, the light emerging from the output end portion of said first light guide impinges on a surface of a medium at an angle of incidence β, and wherein β=ƒ(α,θ); fitting the body, the displacement of which is to be measured, with an inclined surface, positioning said sensor adjacent to said surface, measuring the distance to said surface, displacing the body and measuring the distance thereto, and calculating the displacement of said body based on said measurements.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a cross-sectional view of a sensor according to the present invention, utilizing rod-shaped solid light guides;

FIG. 2 is a cross-sectional view of a sensor utilizing a cone-shaped solid light guide;

FIG. 3 is a cross-sectional view of a sensor utilizing a pyramid-shaped solid light guide;

FIG. 4 is a cross-sectional view of a further embodiment of the sensor according to the present invention, utilizing light measuring means;

FIG. 5 is a cross-sectional view of a sensor according to the present invention and a body, the displacement of which is to be measured, and FIG. 6 is a graph representing characteristics of output signals U versus the measuring distance L.

DETAILED DESCRIPTION OF PREFERRED EMBODIMENTS

Figure 1:
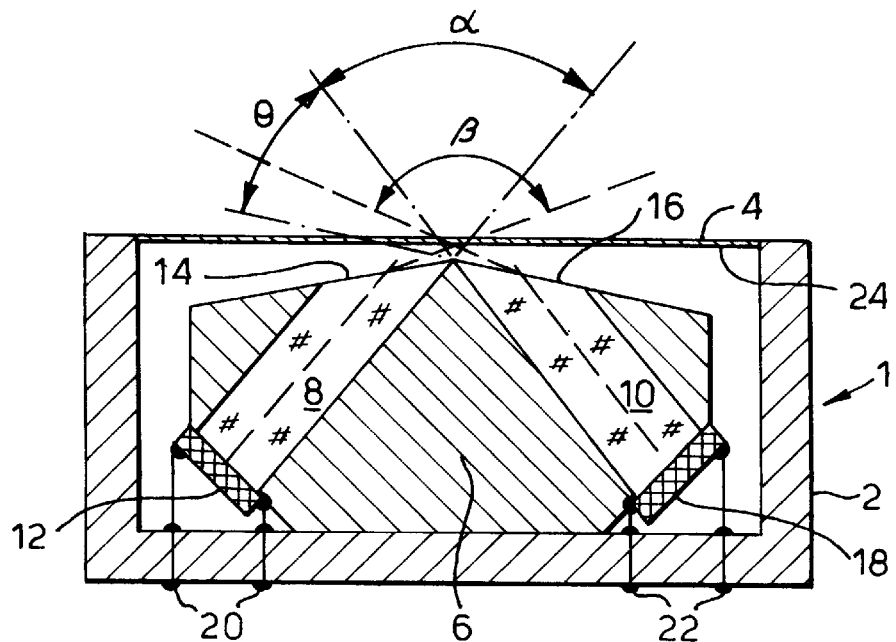

There is seen in FIG. 1 a sensor 1 including a cup-shaped housing 2, preferably made of opaque material, and a membrane 4 constituting a medium as hereinbefore described, stretched across the open face thereof so as to form an enclosure substantially opaque to light. Inside the housing there is mounted a body 6, configured to hold a pair of solid rod-shaped light guides 8 and 10. The first light guide 8 is fitted with a light source 12, e.g., an LED, optically coupled at one end of the guide 8. The light guide 8 has a light output face 14 at its other end. The second light guide 10 has a light receiving face 16 at one end and a light measuring means, e.g., a light detector 18, optically coupled at the other end. Both the light source 12 and the light detector 18 are electrically connectable by means of conductors 20, 22 leading to the outside of housing 2. The faces 14 and 16 of light guides 8 and 10 are cut at an angle θ with respect to the optical axis of the light guides, so as to include an angle α between the axes of the light guides. Upon operation, the light emerging from the face 14 impinges on the internal surface 24 of the membrane 4, at an angle of incidence β, wherein β=ƒ(α,θ).

Figure 2:
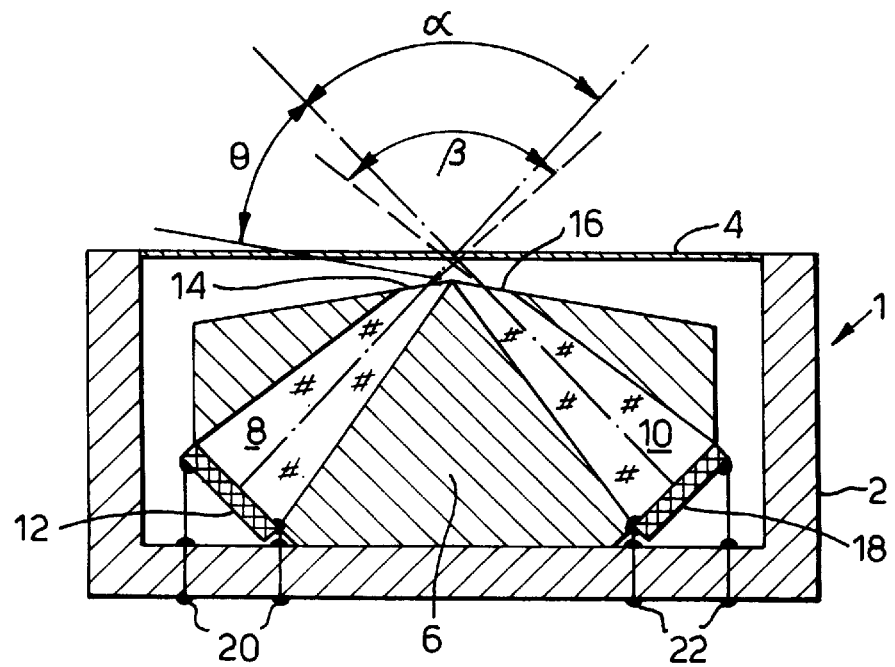

Referring to FIG. 2, there is illustrated a further embodiment of the invention in which the solid light guides 8 and 10 are cone-shaped. This configuration facilitates transmitting and receiving greater proportions of the light energy emanating from light source 12.

Figure 3:
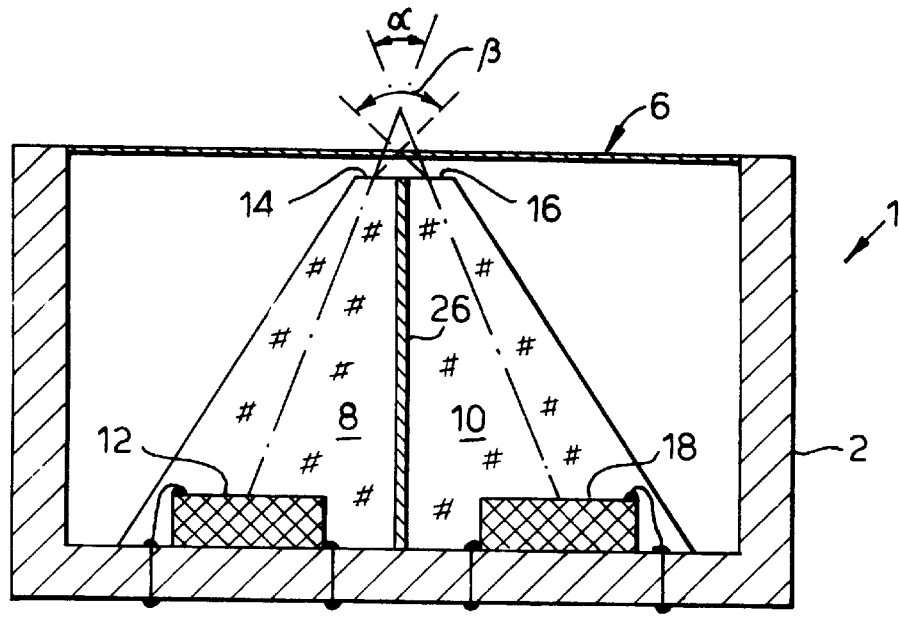

In FIG. 3 there is shown a sensor 1 in which the solid light guides 8 and 10 are pyramid-shaped bodies separated by an opaque partition 26. Advantageously, the light source 12 and detector 18 are embedded in the bases of the pyramid-shaped bodies, as seen, and the partition 26, which may have a thickness of less than several microns, extends across the entire abutting surfaces of the bodies.

Figure 4:
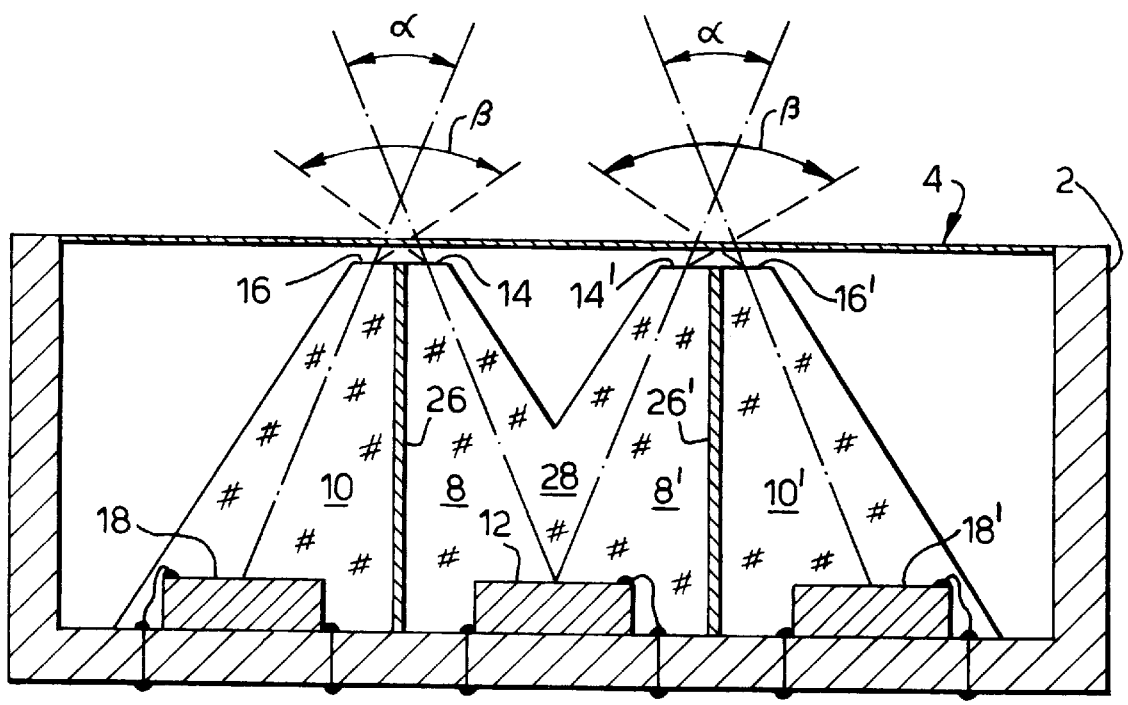

In order to diminish the dependency of the sensor on the stability of the light source, there may be provided a sensor having a single light source 12 and two light detectors 18, 18', as shown in FIG. 4. The single light source 12 transmits light towards two points on the medium, e.g., the membrane 4, through the two faces 14, 14' of solid light guide 28. The light guide 28 is configured as two pyramid-shaped light guides 8, 8', joined at the lower portions of their sloping sides 30, 30'. Solid light guides 10, 10', respectively, direct reflected light via the solid light guides 8, 8' towards the detectors 18, 18'. Each of the light guides 8, 8' adjoins a side of the light guide 28 and is optically separated therefrom by partitions 26, 26', respectively.

The output signals obtained utilizing this sensor are $U_{18}$ and $U_{18'}$. The difference $\Delta U = U_{18} - U_{18'}$ provides information about the change of the input light intensity $I_o$ at any operating temperature and change of conditions, in accordance with the relationship: $U = U_{18}/\Delta U =$ constant.

Figure 5:
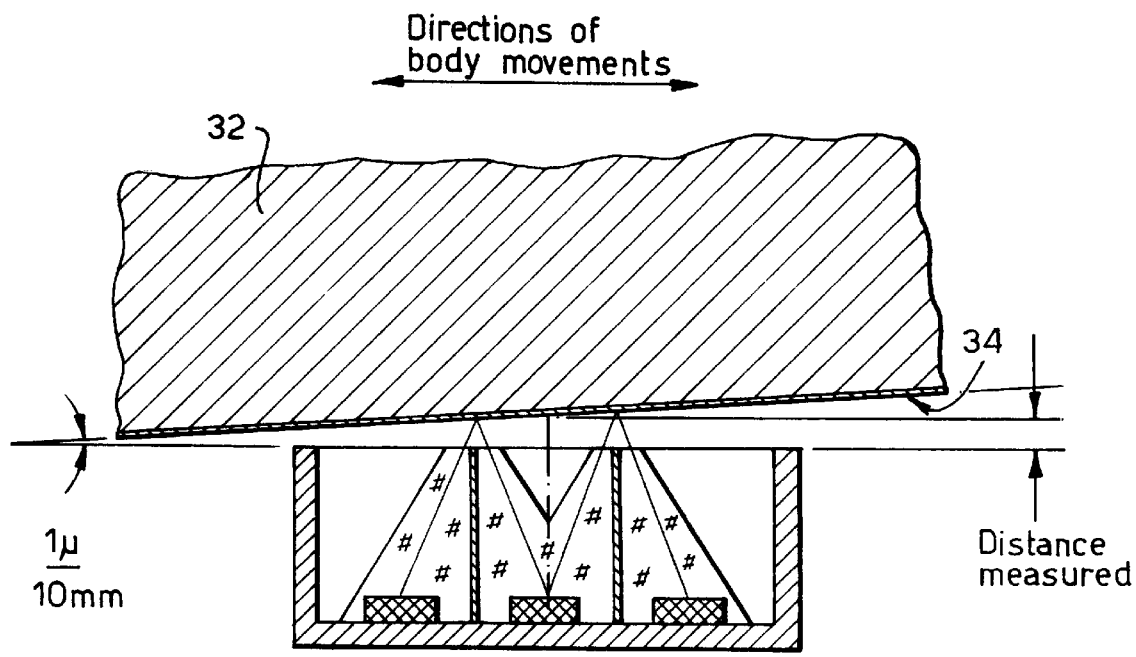

FIG. 5 illustrates a method of measuring the movement of bodies with high accuracy. The possible range of measurement of distances with the sensor of the present invention is from tens up to hundreds or a thousand microns, although the dynamic range of these measurements may be up to $10^7$ microns. In many cases, the required range of measurements of distances, positions and/or movements may be up to tens, hundreds or even a thousand millimeters. The sensor illustrated in FIG. 5 is suitable for the measurement of distances, positions and/or movements of distances up to a thousand millimeters.

The method of measuring displacements with the sensor of FIG. 5 is as follows: The sensor is positioned adjacent to a side of a body 32 displaceable along distances of, e.g., tens to a thousand millimeters. The side of the body 32 directed to the sensor is fitted with an inclined surface 34, so that during the body's displacement, the distance between the sensor and the side of the body 34 will change linearly with the normal range of the sensor's capabilities to measure distances, e.g., from 100 μ up to 150 μ. This range covers the entire range of the body displacement, e.g., from 0 to 500 millimeters. For example, utilizing the sensor of FIGS. 3 and 4, the body's displacement of 500 (mm) corresponds to the sensor's measurement of a change of distance to the inclined surface of 50 μ. The body position may be defined with an error of about $10^{-7}$, or with an accuracy of up to $10^{-7} \times 500$ (mm)=0.05 (μ), which is more than required for accurately determining the position of linear movements of bodies.

In order to calculate the displacement of the body 32, a first measurement is taken by the stationary sensor 1 to a point along the inclined surface 34, the body is then displaced, and a second measurement is taken to a displaced point along the inclined surface 34.

The distance L to the surface 34 of the body 32 can then be calculated by the formula:

$$L = A \tan\beta/\theta \ln(U_o/U)$$

wherein:

A is a coefficient of proportionality;

β is the angle of incidence: β=ƒ(α,θ);

θ is the size of the light guides;

$U_o$ is the DC output signal of the sensor's working point, and

U is the instantaneous output AC signal of the sensor.

The absolute values of the measured distances to the two points on the surface can be calculated by the formula:

$$U_o/U/\Delta L = \delta U/\Delta L = [1 - \theta/A \tan\beta] \exp[-L/A \tan\beta/\theta]$$

When a sensor having two light detectors is used, e.g., the sensor shown in FIGS. 4 and 5, the absolute value of the distances measured to points on the inclined surface of the displaced body is calculated by the formula:

$$L = A \tan\beta/\theta * \ln[(U_1+U_2)*(U_1+U_2)]$$

wherein:

$U_1$ is the output signal from the first light detector 18; and $U_2$ is the output signal from the second light detector 18'.

Figure 6:
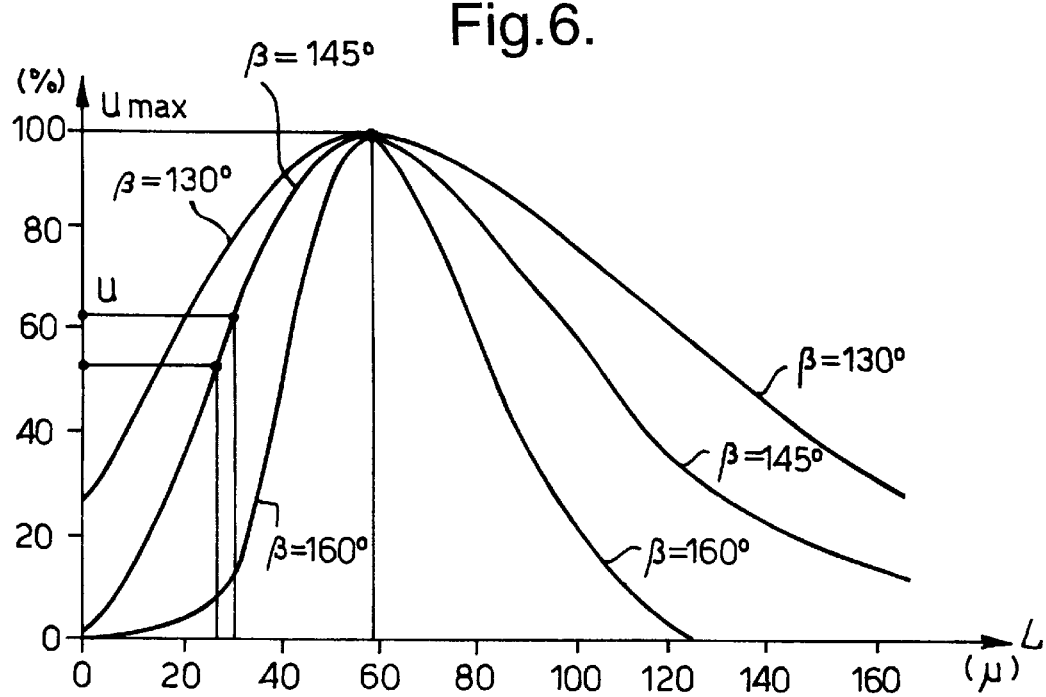

FIG. 6 illustrates the main characteristics of the sensor, connecting its output signal U with the measuring distance L under different values of angle β. The vertical axis of the graph is the output signal U; the horizontal axis of the graph is the measuring distance in μ. $U_o$ is the DC output signal of the sensor, which is the sensor working point. U is the instantaneous sensor output signal, the AC output signal. As can be seen from the graph, when the angle β increases, the steepness of the sensor characteristics rises, and the sensor becomes more and more sensitive to the change of distance which is measured.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A sensor for sensing the distances to a medium and/or displacements and the physical properties of said medium comprising:

a housing;

at least one pair of solid light guides each having an input end face and an output end face;

at least one source of light and at least one light intensity measuring means;

the input end face of a first light guide being optically coupled to a source of light and the output end face of a second light guide being optically coupled to a light intensity measuring means;

means for isolating said light guides from each other while at least the faces thereof are located in close proximity to each other;

each of said faces being cut at an angle θ with respect to the optical axis of its waveguide and said axis forming an angle α therebetween;

the apparatus being such that, upon operation, the light emerging from the output end portion of said first light guide impinges on a surface of a medium at an angle of incidence $\beta$, and wherein $\beta = f(\alpha, \theta)$.

2. The sensor as claimed in claim 1, wherein said light guides are solid, rod-shaped bodies.

3. The sensor as claimed in claim 1, wherein said light guides are solid, cone-shaped bodies.

4. The sensor as claimed in claim 1, wherein said light guides are solid, pyramid-shaped bodies.

5. The sensor as claimed in claim 1, wherein said light source is at least partly embedded in an end portion of said light guide.

6. The sensor as claimed in claim 1, wherein there is provided a single light source and two light intensity measuring means.

7. The sensor as claimed in claim 6, wherein light from said single source is directed via one of said solid light guides to two spaced-apart locations.

8. The sensor as claimed in claim 1, wherein one of said solid light guides is located inside the sensor housing intermediate to two solid light guides, each coupled to a light intensity measuring means.

9. A method of measuring displacement of a body, comprising:

providing a sensor according to claim 1;

fitting the body, the displacement of which is to be measured, with an inclined surface, positioning said sensor adjacent to said surface;

measuring the distance to said surface;

displacing the body and measuring the distance thereto, and calculating the displacement of said body based on said measurements.

10. The method as claimed in claim 9, wherein the distance L between the sensor and a point along the inclined surface of said body is calculated by the formula:

$$L = A \tan\beta/\theta \ln(U_o/U)$$

wherein:

A is a coefficient of proportionality;

$\beta$ is the angle of incidence: $\beta = f(\alpha, \theta)$;

$\theta$ is the size of the light guides;

$U_o$ is the DC output signal of the sensor's working point, and

U is the instantaneous output AC signal of the sensor.

11. The method as claimed in claim 9, wherein the absolute values of the measured distances is calculated by the formula:

$$U_o/U/\Delta L = \delta U/\Delta L = [1 - \theta/A \tan\beta] \exp[-L/A \tan\beta/\theta].$$

* * * * *